US006732103B1

(12) United States Patent
Strick et al.

(10) Patent No.: US 6,732,103 B1
(45) Date of Patent: May 4, 2004

(54) SYSTEMS AND METHODS FOR GENERATING AND TRANSMITTING EVENT INFORMATION AND FOLLOW-UP EVENT COORDINATION INFORMATION

(75) Inventors: Andrew Strick, Colorado Springs, CO (US); Vernon M. Cope, Colorado Springs, CO (US); James W. Bann, Colorado Springs, CO (US); Brian Gibbins, Monument, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/851,006

(22) Filed: May 8, 2001

(Under 37 CFR 1.47)

(51) Int. Cl.[7] .............................................. G06F 17/30
(52) U.S. Cl. ...................... 707/10; 709/203; 709/206; 705/9; 708/112
(58) Field of Search .................. 707/10, 102; 709/206, 709/207, 203; 705/8, 9; 708/112

(56) References Cited

U.S. PATENT DOCUMENTS

| 5,070,470 A | * | 12/1991 | Scully et al. ................... 705/8 |
| 5,261,045 A | * | 11/1993 | Scully et al. ............... 345/751 |
| 5,303,145 A | * | 4/1994 | Griffin et al. ................ 345/168 |
| 5,428,784 A | * | 6/1995 | Cahill, Jr. .................... 708/112 |
| 5,930,471 A | * | 7/1999 | Milewski et al. ........... 709/204 |
| 5,963,913 A | * | 10/1999 | Henneuse et al. .............. 705/9 |
| 6,016,478 A | * | 1/2000 | Zhang et al. ................... 705/9 |
| 6,101,480 A | * | 8/2000 | Conmy et al. ................. 705/9 |
| 6,108,688 A | * | 8/2000 | Nielsen ...................... 709/206 |
| 6,175,859 B1 | * | 1/2001 | Mohler ....................... 709/206 |
| 6,363,352 B1 | * | 3/2002 | Dailey et al. ................... 705/9 |
| 6,463,463 B1 | * | 10/2002 | Godfrey et al. ............. 709/206 |
| 6,636,888 B1 | * | 10/2003 | Bookspan et al. .......... 709/203 |

OTHER PUBLICATIONS

Townsend et al., "Microsoft Office 6 in 1" pp. 599–603, Que Corp. 1994.*

* cited by examiner

Primary Examiner—Jean R. Homere

(57) ABSTRACT

Systems and methods for managing logistics associated with an event or meeting enable a user to enter event-related information using a graphical user interface. The event-related information may include a list of invitees and a location and time for the planned event. The system then automatically transmits invitation messages to the desired invitees, re-invites those invitees that fail to respond to the invitation and sends reminder messages to those invitees that indicate that they will attend the event. The system also automatically generates a status report relating to the event based on the received responses and lack of responses.

29 Claims, 12 Drawing Sheets

SYSTEMS AND METHODS FOR GENERATING AND TRANSMITTING EVENT INFORMATION AND FOLLOW-UP EVENT COORDINATION INFORMATION

FIELD OF THE INVENTION

The present invention relates generally to a network-based management tool and, more particularly, to a system and method for managing event scheduling and coordination.

BACKGROUND OF THE INVENTION

Planning, scheduling, and coordinating meetings for even a small group of people can often be laborious. The difficulty in coordinating meetings seems to increase exponentially as the number of desired participants increases. Contacting the desired participants is only the first hurdle in the process. Gathering responses from all of the individual invitees often becomes almost unmanageable as the workforce becomes more and more mobile. Even after a person has committed to attending an important meeting, the fast pace of business today may often result in a busy individual forgetting to attend a meeting that he or she had previously agreed to attend.

For example, suppose that a person needs to schedule a meeting for twenty company employees. It may take several days to initially contact all twenty parties by phone. An easier approach could be to send out an e-mail message to all twenty parties. The meeting planner, however, must gather, read, and record the incoming responses. At some point, a decision must be made to contact the non-respondents to re-invite them to the meeting.

As another example, suppose that a meeting planner has managed to contact and manually record the responses of thirty busy members of the engineering department for attendance at a meeting to be held in two weeks. Even if all thirty agreed to attend the subject meeting weeks before it is scheduled, the chances are high that at least some, and probably a significant number, of the invitees will forget about the meeting when the appropriate time comes. After having no contact with the invitees since the original response, the meeting planner may be surprised when several invitees fail to show up at the meeting.

Suppose, as a final example, that attendance at a meeting by a large number of company employees is desired. Further suppose that a large percentage of the desired invitees must attend the meeting, or else the meeting has to be cancelled and rescheduled at a more appropriate time. Receiving, categorizing, and managing the replies of all the invitees would require a full-time effort by at least one individual who would have to maintain and manually update a chart as the responses are received. An up-to-date report on the status of the invitations and responses would be difficult to maintain.

Accordingly, there is a need for a system and method that manages an invitation process, re-invites those invitees who fail to respond, reminds invitees about the upcoming meeting, and combines the replies from all invitees into a consolidated report that is available on request.

SUMMARY OF THE INVENTION

Systems and methods consistent with the present invention address these and other needs by providing a mechanism through which an event scheduling tool can automatically manage the coordination of a meeting or other event for a user.

In accordance with the purpose of this invention as embodied and broadly described herein, a computer-implemented method for managing an event is provided. The computer-implemented method includes receiving event information, generating at least one message relating to the event and transmitting the at least one message to a plurality of event invitees. The computer-implemented method also includes receiving at least one response from at least one of the invitees and generating a status report based on the responses.

In another implementation consistent with the present invention, a computer-readable medium having stored sequences of instructions is provided. The sequences of instructions when executed by at least one processor, cause the processor to provide a user interface for entering event information, receive event information via the user interface and generate at least one message relating to the event. The instructions also cause the processor to transmit the at least one message to a plurality of event invitees, receive at least one response from at least one of the invitees and generate a status report based on the responses.

In yet another implementation consistent with the present invention, a method for tracking responses to a questionnaire is provided. The method includes transmitting the questionnaire to a plurality of recipients and receiving responses to the questionnaire from at least one of the recipients. The method further includes transmitting reminder notices to non-responding recipients and generating a status report based on the responses.

In a further implementation consistent with the present invention, a system for providing event planning management in a network having a plurality of user devices is provided. The system includes a memory that stores data relating to an event and a processor coupled to the memory. The processor is configured to receive event scheduling information and generate messages relating to the event based on input from one of the user devices. The processor is also configured to transmit the messages to invitees via the network, receive responses from the invitees and generate a report based on the received responses.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims and equivalents.

Implementations consistent with the present invention provide a method and apparatus by which the task of managing logistics associated with a meeting or other event can be effectively automated. After inputting event-related information, the present invention automatically completes the invitation process, sends re-invitations to those invitees who failed to respond after a specific time period, sends reminder messages to invitees shortly before the meeting date, and prepares a status report for the event planner to query at any time.

EXEMPLARY SYSTEM CONFIGURATION

Figure 1:
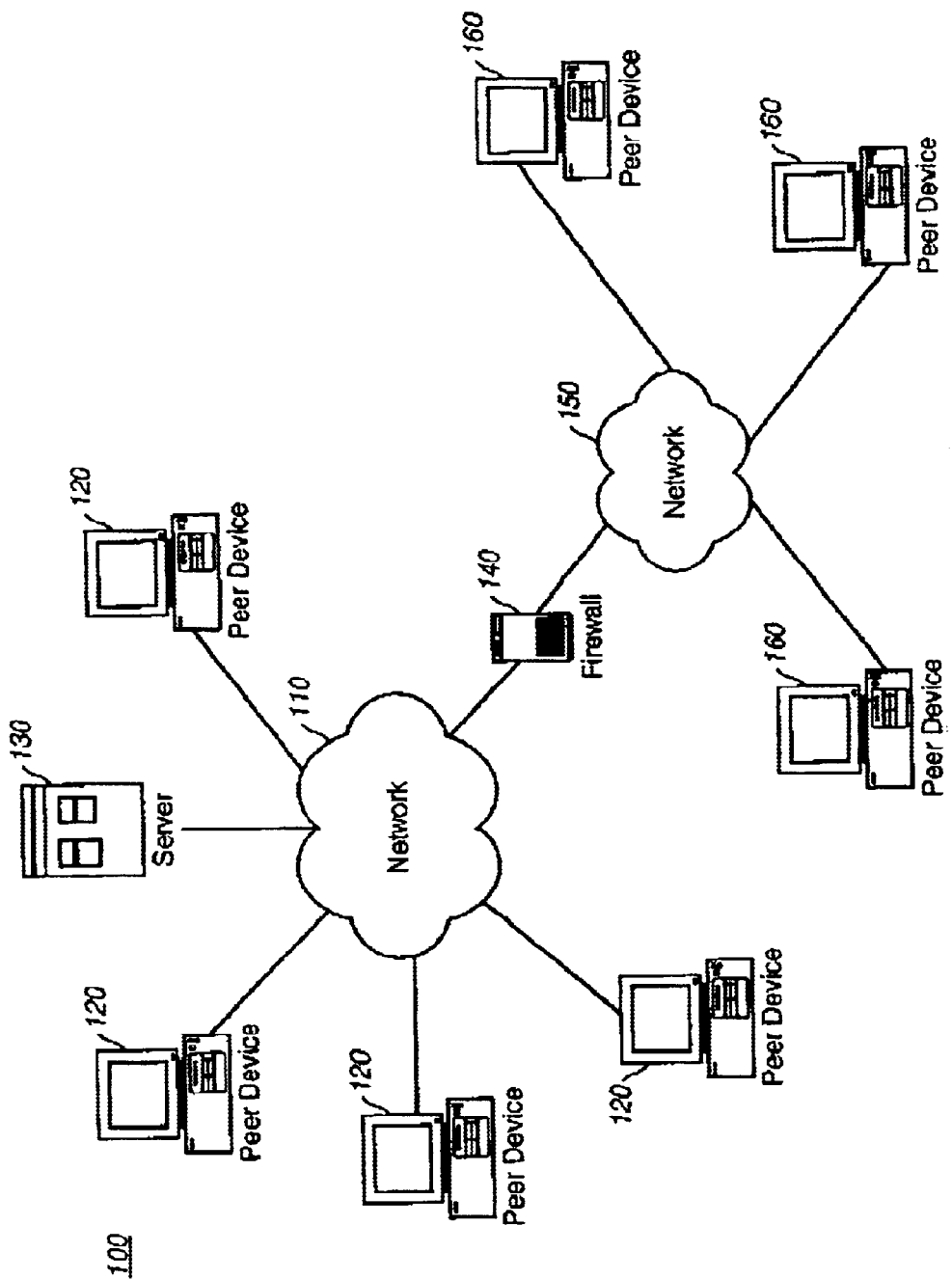
FIG. 1 illustrates an exemplary system in which systems and methods consistent with the present invention may be implemented.

FIG. 1 illustrates an exemplary system 100 in which systems and methods consistent with the present invention may be implemented. The exemplary system 100 includes several peer devices 120 and at least one server 130 interconnected through a network 110. In addition, system 100 may also include one or more firewalls 140, and peer devices 160 interconnected through a network 150. It will be appreciated that system 100 could include more or less devices than are shown in FIG. 1.

The peer devices 120 may include any type of computer system, such as a mainframe, minicomputer, personal computer, laptop, personal digital assistant, and the like, capable of connecting to the network 110. Peer devices 120 may connect to network 110 in any conventional manner, such as via a wired, wireless, or optical connection.

Similarly, the peer devices 160 may include any type of computer system, such as a mainframe, minicomputer, personal computer, laptop, personal digital assistant, and the like, capable of connecting to the network 150. Peer devices 160 may connect to network 150 in any conventional manner, such as via a wired, wireless, or optical connection.

Server 130 may include any type of computer system, such as a mainframe, minicomputer, or personal computer, capable of connecting to the network 110 to enable the server 130 to communicate with the peer devices 120 and peer devices 160. In alternative implementations, the server 130 may include a mechanism for directly connecting to one or more peer devices 120 or may be included within a peer device 120. The server 130 may transmit data over network 110 or receive data from the network 110 via a wired, wireless, or optical connection. Firewall 140 may include any combination of hardware, software, or firmware components to prevent external unauthorized personnel, such as computer hackers, or the like, from entering an internal network, such as network 110.

The network 110 may include one or more conventional networks, such as an intranet, the Internet, a wide area network (WAN), a local area network (LAN), or other similar types of networks. Network 150 may include one or more conventional networks, such as the Internet, an intranet, a WAN, a LAN, or other similar types of networks.

EXEMPLARY SERVER

Figure 2:
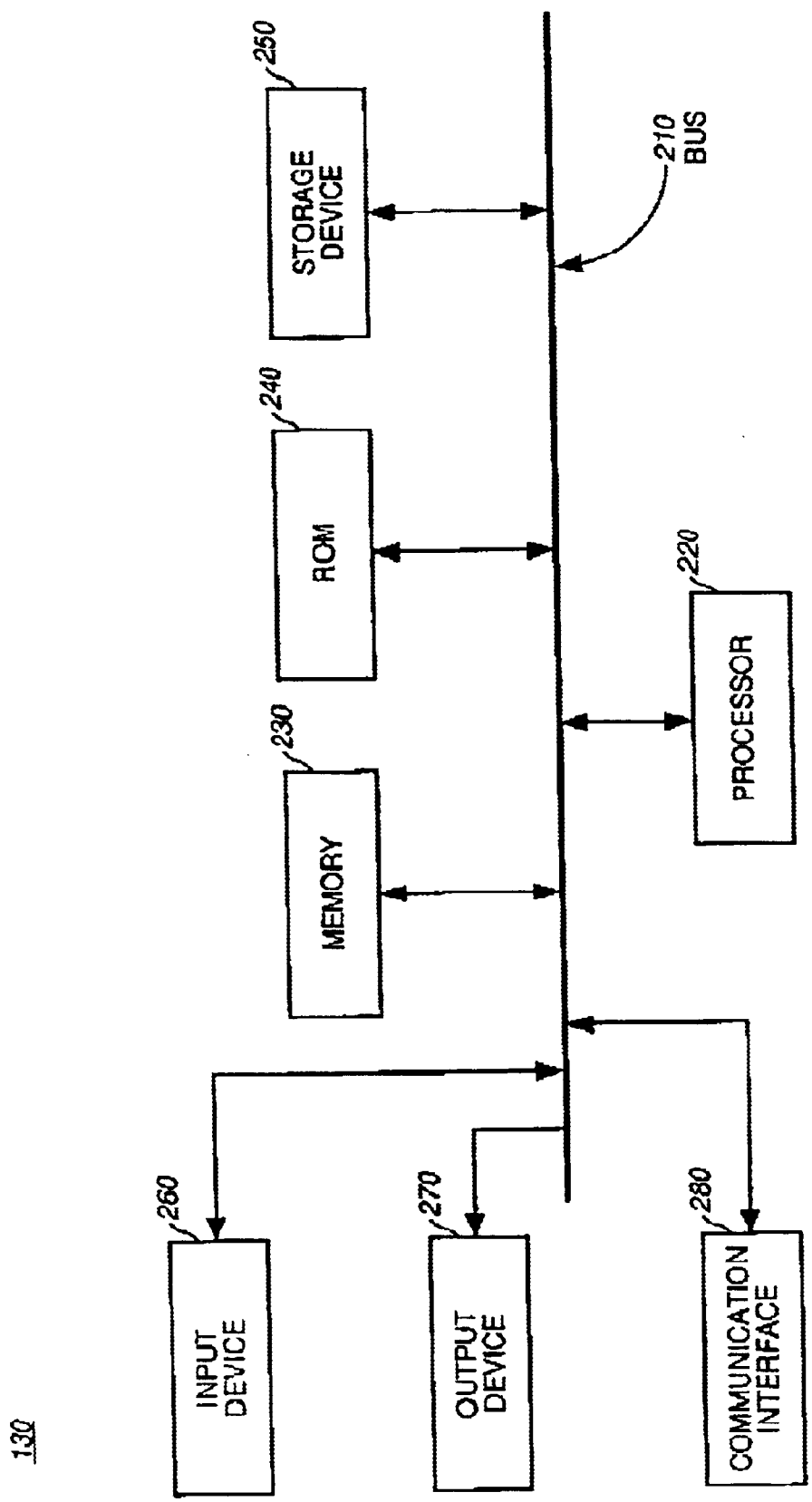
FIG. 2 illustrates an exemplary configuration of the server of FIG. 1, consistent with the present invention.

FIG. 2 illustrates an exemplary server 130 consistent with the present invention. In FIG. 2, the server 130 includes a bus 210, a processor 220, a memory 230, a read only memory (ROM) 240, a storage device 250, an input device 260, an output device 270, and a communication interface 280. The bus 210 permits communication among the components of the server 130.

The processor 220 may include any type of conventional processor or microprocessor that interprets and executes instructions. The memory 230 may include a random access memory (RAM) or another type of dynamic storage device that stores information and instructions for execution by the processor 220. Memory 230 may also be used to store temporary variables or other intermediate information during execution of instructions by processor 220.

ROM 240 may include a conventional ROM device and/or another type of static storage device that stores static information and instructions for processor 220. The storage device 250 may include a magnetic disk or optical disk and its corresponding drive and/or some other type of magnetic or optical recording medium and its corresponding drive for storing information and/or instructions.

The input device 260 may include any conventional mechanism that permits an operator to input information to the server 130, such as a keyboard, a mouse, a microphone, a pen, voice recognition or any other biometric mechanisms, etc. The output device 270 may include any conventional mechanism that outputs information to the operator, including a display, a printer, a headphone, a pair of speakers, etc.

The communication interface 280 may include any transceiver-like mechanism that enables the server 130 to communicate with other devices and/or systems, such as peer devices 120 or peer devices 160, either directly or indirectly through mailboxes, an information bulletin board, or any other method. For example, the communication interface 280 may include a modem or an Ethernet interface to a network. Alternatively, communication interface 280 may include other mechanisms for communicating via a network, such as network 110 or network 150.

Server 130, consistent with the present invention, manages event scheduling and coordination in response to processor 220 executing sequences of instructions contained in memory 230. Such instructions may be read into memory 230 from another computer-readable medium, such as a storage device 250, or from a separate device via communication interface 280. A computer-readable medium may include one or more memory devices and/or carrier waves. Execution of the sequences of instructions contained in memory 230 causes processor 220 to perform the process steps that will be described hereafter. In alternative embodiments, hard-wired circuitry may be used in place of or in combination with software instructions to implement the present invention. Thus, the present invention is not limited to any specific combination of hardware circuitry and software.

EXEMPLARY PEER DEVICE

Figure 3:
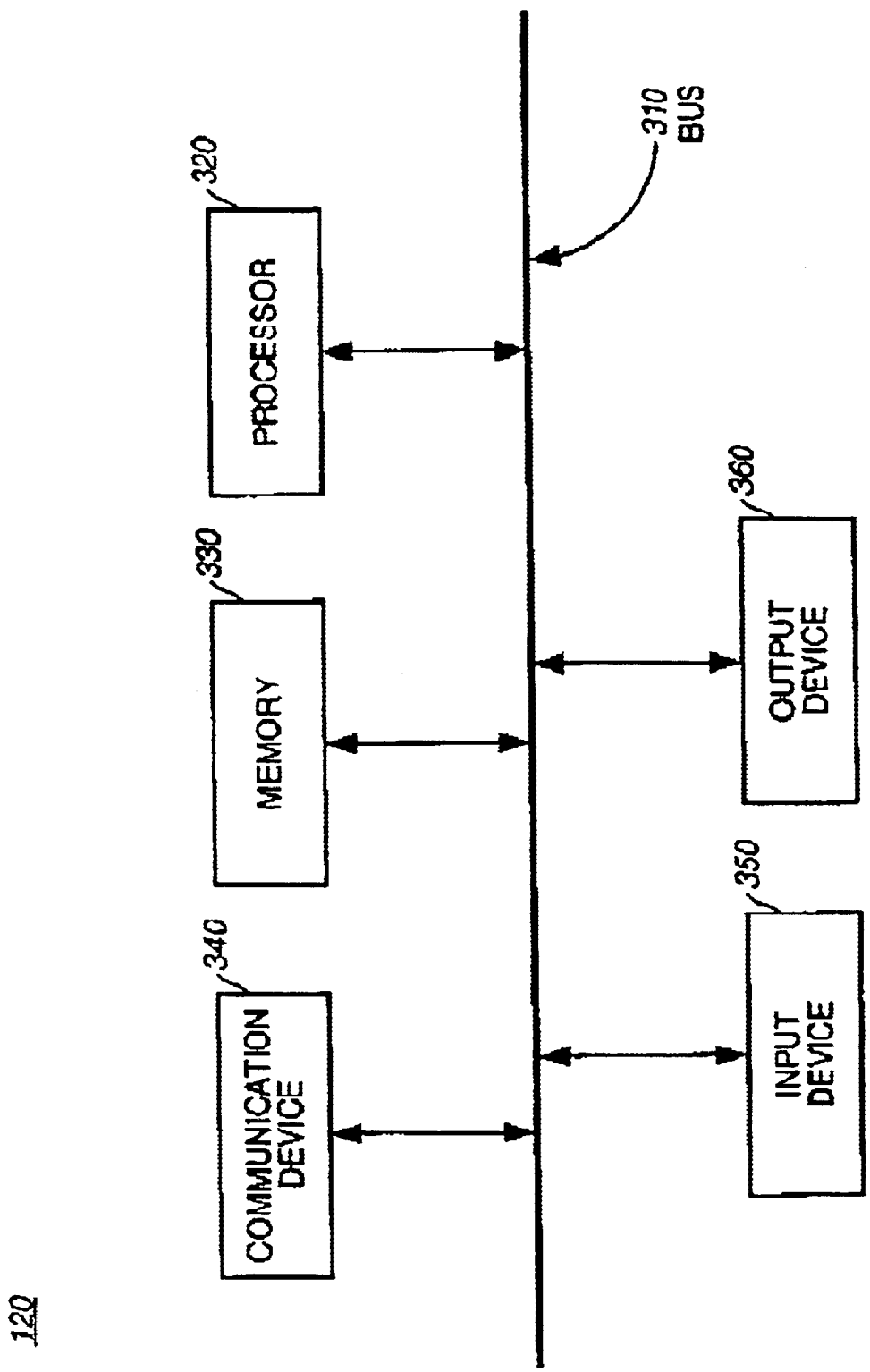
FIG. 3 illustrates an exemplary configuration of a peer device of FIG. 1, consistent with the present invention.
Figure 4:
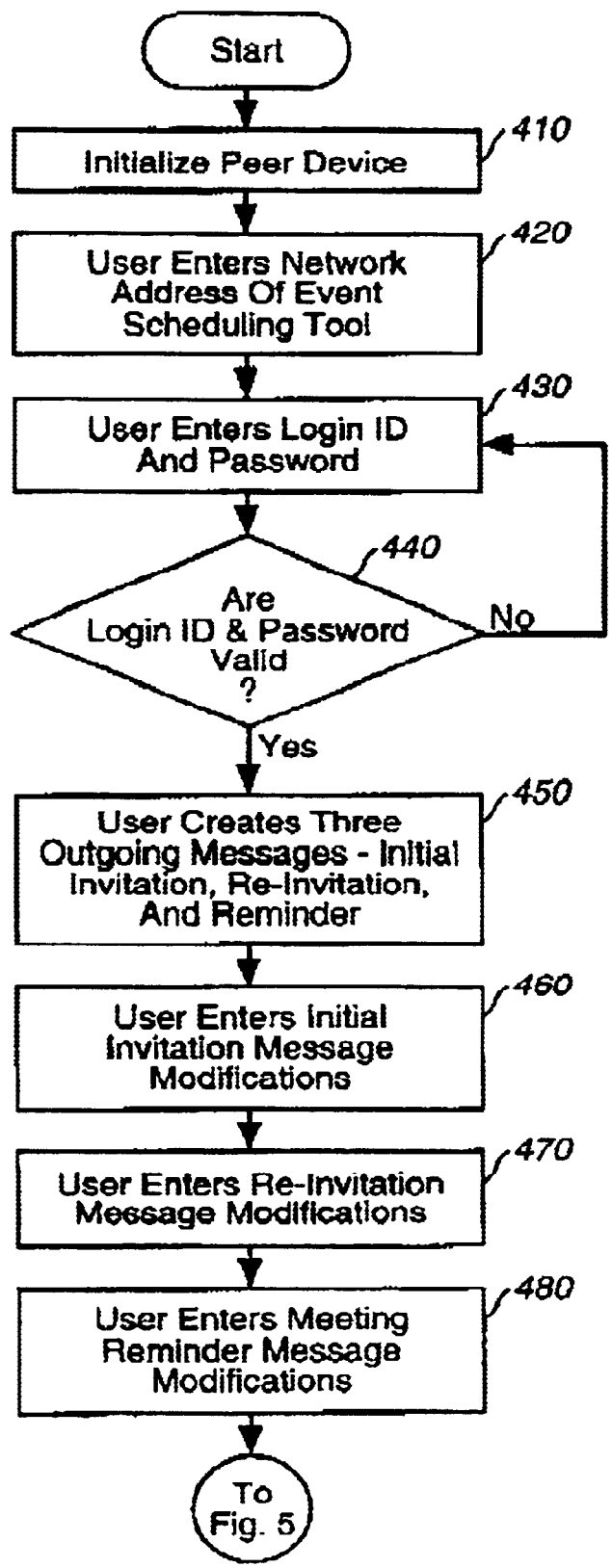
FIGS. 4–7 illustrate exemplary processing associated with managing an event, consistent with the present invention.

FIG. 3 illustrates an exemplary peer device 120 consistent with the present invention. Peer device 120 includes a bus 310, a processor 320, a memory 330, a communication device 340, an input device 350, and an output device 360. Peer devices 160 may be similarly configured.

The bus 310 permits communication among the components of peer device 120. The processor 320 may include any type of conventional processor or microprocessor that interprets and executes instructions. The memory 330 may include a RAM or another type of dynamic storage device that stores information and instructions for execution by the processor 320; a ROM or another type of static storage device that stores static information and instructions for use by the processor 320; and/or some type of magnetic or optical recording medium and its corresponding drive.

The communication device 340 may include any transceiver-like mechanism that enables peer device 120 to communicate with other devices and/or systems. For example, the communication device 340 may include mechanisms for communicating with other peer devices 120, peer devices 160, or server 130 via a network, such as network 110 or network 150 (FIG. 1).

The input device 350 may include any conventional mechanism that permits an operator to input information to peer device 120, such as a keyboard, a mouse, a pen, voice recognition or any other biometric mechanisms, and the like. The output device 360 may include any conventional mechanism that outputs information to the operator, including a display, a printer, a pair of speakers, a headphone, etc.

Execution of the sequences of instructions contained in memory 330 causes processor 320 to perform the functions described hereafter. In alternative embodiments, hard-wired circuitry may be used in place of or in combination with software instructions to implement the present invention. Thus, the present invention is not limited to any specific combination of hardware circuitry and software.

EXEMPLARY PROCESS FOR MANAGING AN EVENT

FIGS. 4–7 illustrate exemplary processing associated with managing an event, consistent with an implementation of the present invention. Processing begins with the initialization of a peer device, such as peer device 120 [step 410]. Initialization may include powering up the peer device 120 and performing a boot-up process. The user may then access a graphical user interface (GUI) associated with the event scheduling tool that will allow him or her to navigate through various screens via network 110 [step 420]. In an exemplary implementation of the present invention, assume that the event scheduling tool resides on server 130 (FIG. 1). In this case, the user may enter a network address associated with server 130. The address may be a Uniform Resource Locator (URL) associated with server 130.

Upon connecting with server 130, the user may enter unique personal identifiers before access to the event scheduling tool is authorized [step 430]. After receiving a personal login identifier (ID) and associated password, a determination is made as to whether the login ID and password are valid [step 440]. The login ID and password may each consist of alphanumeric characters of a specified length that are entered into the peer device 120 through key strokes or manipulation of a mouse, for example. In other implementations, the login ID and/or password may consist of voice recognition or some other biometric mechanism to authenticate the user. If the login ID and associated password are not valid the user may be asked to reenter them. The user may, for example, be given three attempts to successfully complete the login process before being ejected from the system. If the login ID and password are valid, the user will be permitted access to the event scheduling tool.

Figure 10:
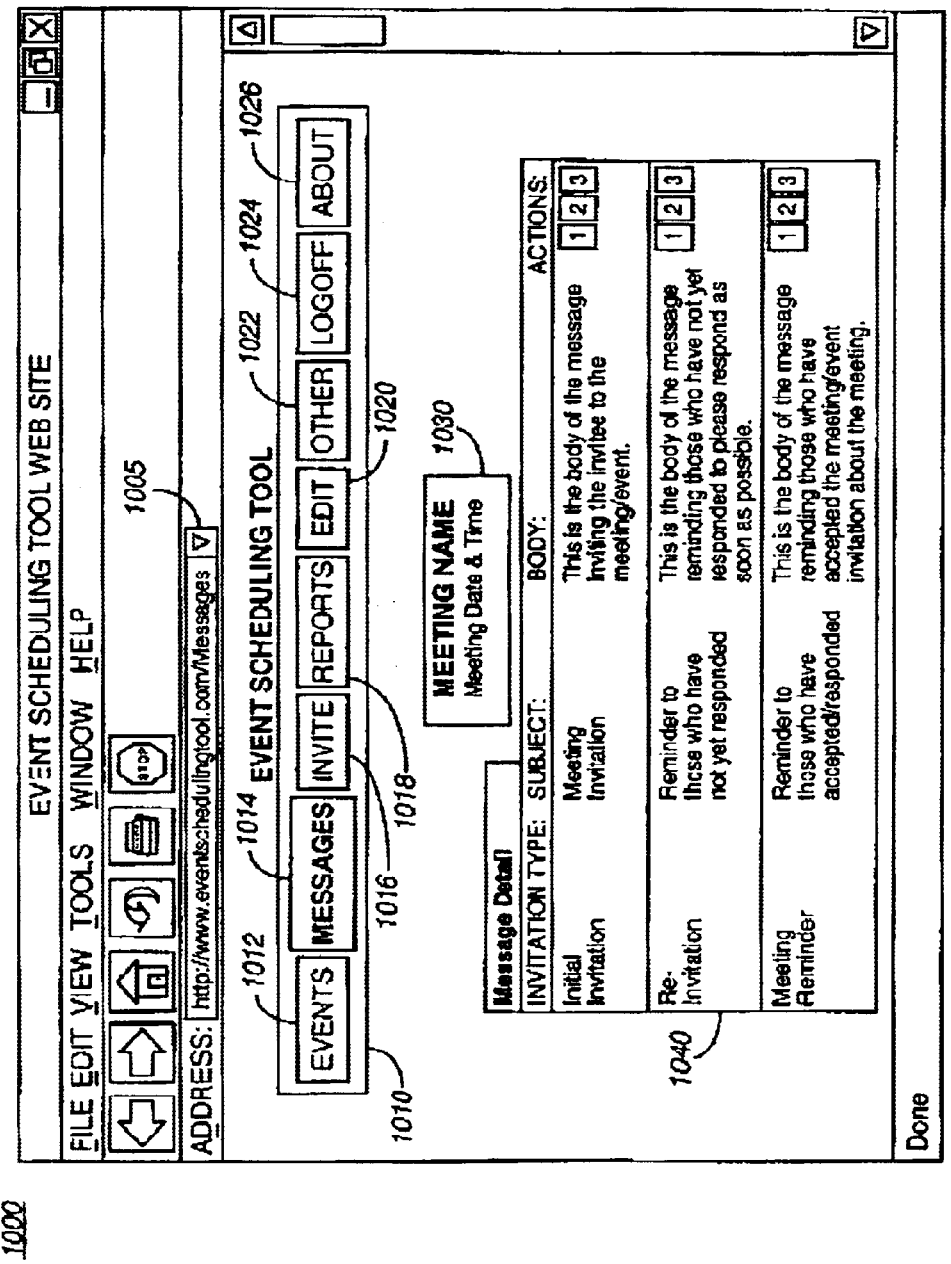
FIG. 10 illustrates an exemplary graphical user interface consistent with the present invention through which a user enters and views message information.

The user may then interact with the event scheduling tool to create outgoing messages to be used to attract the desired invitees to the meeting or event [step 450]. For example, FIG. 10 illustrates an exemplary GUI 1000 consistent with the present invention through which customized message information may be entered. The exemplary GUI 1000, in the form of a web page, includes a URL entry slot 1005, a function button set 1010, a meeting information indicator 1030, and a message detail section 1040.

The URL entry slot 1005 displays the URL that identifies the event scheduling tool web page. The function button set 1010 facilitates the initiation of various functions available within the event scheduling tool. The functions include events 1012, messages 1014, invite 1016, reports 1018, edit 1020, other 1022, logoff 1024, and about 1026.

Events 1012 may take the user to a GUI that lists all scheduled events or meetings. From this GUI, the user may, for example, select the event of interest and thereby navigate a set of screens or web pages associated with the selected event. Messages 1014 may take the user to a GUI that lists the messages to be sent out to the invitees as depicted by FIG. 10. These message types may include initial invitations, re-invitations, and meeting reminders. The user may modify these messages and/or create additional custom messages. Invite 1016 may take the user to a GUI from which invitees can be selected. The selection of invitees may, for example, include different categories of invitees such as individuals, specified groups, departments, skill fields, locations, managers, employees, etc. The user may choose one of the existing categories or may, for example, create a new list of invitees or modify an existing list.

Reports 1018 may allow the user to view a report detailing all invitee replies. This report may be automatically updated by the event scheduling tool and may, therefore, allow the user to view a detailed report on the status of the individual replies of all invitees by name. Edit 1020 may allow the user to change the meeting name, location, time, or other scheduling specific information. A user may, for example, click on the edit 1020 button and the event scheduling tool may download a new GUI from which all of the scheduling specific information is available for modification. Other 1022 may represent miscellaneous other functions consistent with the present invention. Logoff 1024 may represent the exit function that takes the user out of the event scheduling tool. About 1026 may provide information related to the version number, date, etc. of the event scheduling tool.

Meeting information indicator 1030 may indicate the meeting name, date, and time associated with a meeting currently being viewed. Message detail section 1040 may contain prompts for the user to enter the specific messages associated with his/her meeting. For example, message detail section 1040 may include user entry boxes that allow the user to enter a customized message for an initial invitation, a re-invitation, and a meeting reminder. Pre-stored messages may also be available to the user. These pre-stored messages may, for example, be available through a drop-down menu to facilitate the -entry of the particular messages.

The user may make modifications to the initial invitation message at any time [step 460]. These modifications may be added to provide additional detail to the basic initial invitation message, and may be accomplished, for example, by clicking one of the action buttons associated with the initial invitation. In a similar fashion, the user may modify the re-invitation message [step 470] and the reminder message [step 480].

Figure 5:
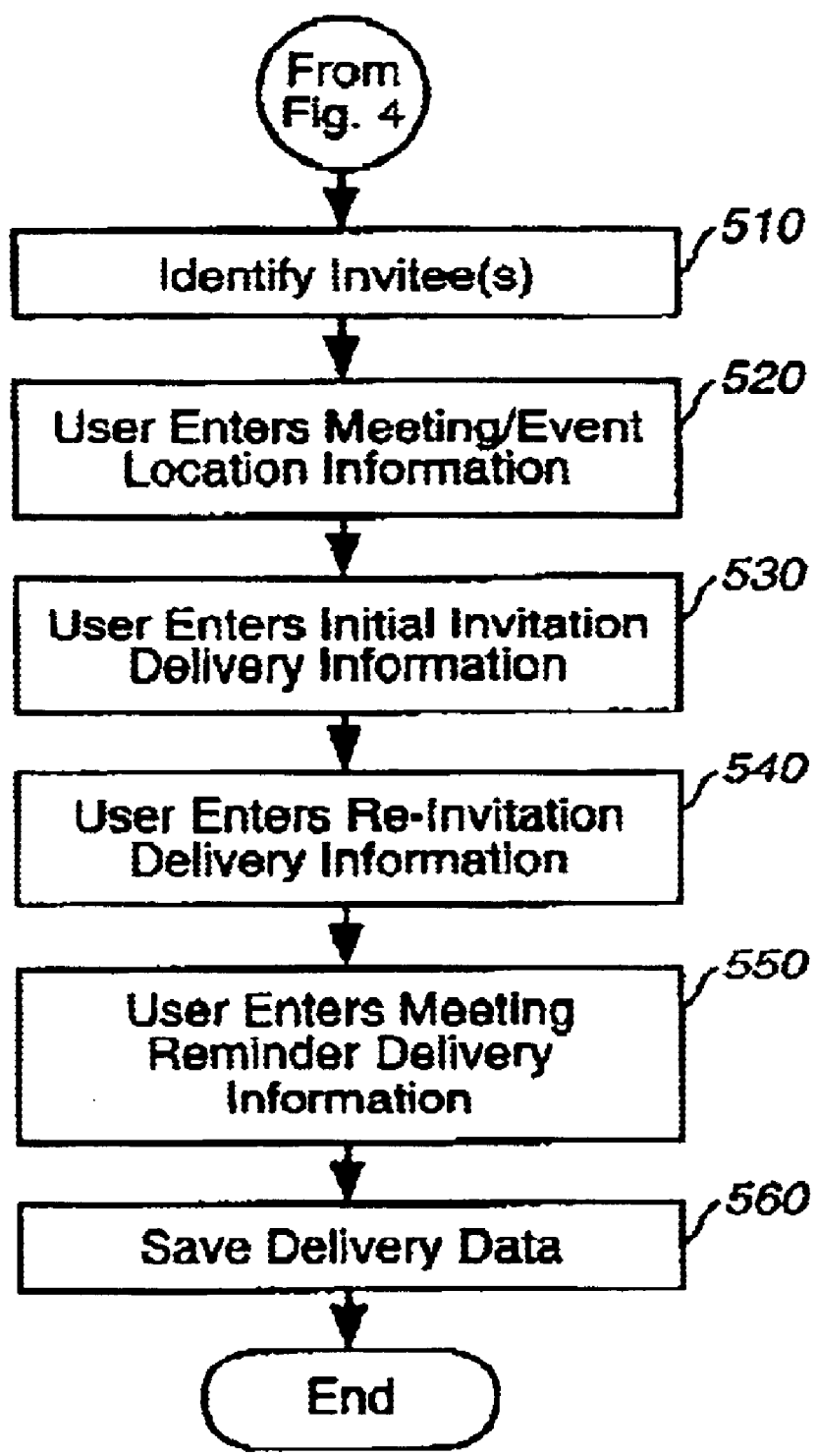

The user may then select the invitee list for the upcoming meeting or event [FIG. 5, step 510]. The invitee list may be accessed by selecting the invite 1016 button (FIG. 10).

Activation of invite 1016 may take the user to a GUI screen at which various invitees may be entered or chosen. The invitees may be manually entered, for example, by inputting an e-mail address for each invitee. Alternatively, the invitees may be chosen, for example, individually, by designated group, by organization, or by any other affiliation, by selecting a pre-stored invitee(s) from a list of parties. The invitee list may be updated or modified by users of the event scheduling tool at any time. A user may also exclude one or more individuals from a specific category by manually removing them from the invitee list.

Figure 11:
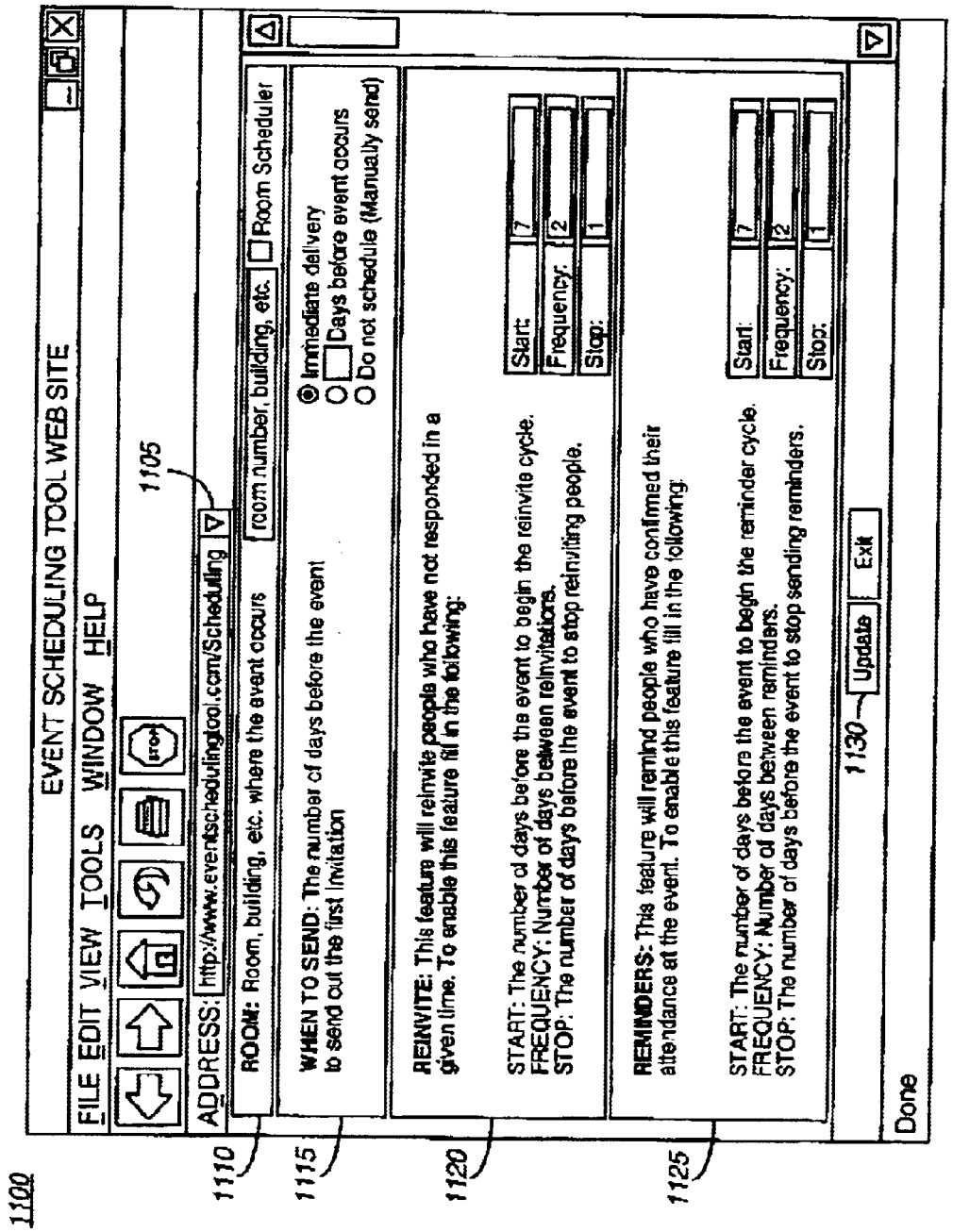
FIG. 11 illustrates an exemplary graphical user interface through which message delivery information may be entered.

The user may then enter the meeting/event location information to the event scheduling tool [step 520]. For example, FIG. 11 illustrates an exemplary GUI 1100 consistent with the present invention, through which message delivery information may be entered. The GUI 1100 may be automatically downloaded to the peer device 120 after the message information input via GUI 1000 (FIG. 10) is received by server 130. Alternatively, GUI 1100 may be accessed by selecting a "Schedule" button on an Invite GUI. In any event, GUI 1100, in the form of a web page, includes a URL entry slot 1105, a location identifier 1110, an initial delivery section 1115, a re-invitation section 1120, a reminder section 1125, and a data update button 1130. The meeting location information may, for example, be entered in the location identifier 1110 section of FIG. 11. The room number, building number, and/or any other pertinent information may be entered in the designated text field of location identifier 1110.

The user may then enter the initial invitation delivery information [step 530]. The initial delivery information may specify when the initial invitation should be sent out to all invitees. This information may be entered by the user through initial delivery section 1115 (FIG. 11). The user may, for example, indicate that the initial invitation should be sent immediately, or in "x" days (where "x" is chosen by the user), or not yet scheduled. The user may determine when to send out the initial invitations by entering the appropriate numerical value corresponding to the number of days before the event occurs in the initial delivery section 1115.

The user may then enter re-invitation delivery information [step 540]. The server 130 may automatically transmit re-invitation messages to those invitees that have not responded to the initial invitation within a time period specified by the user. To enable this feature, the user may enter the desired start time, frequency, and stop time in the respective boxes in re-invitation section 1120 (FIG. 11). The start time may indicate the number of days before the event to begin sending out re-invitation messages. The frequency may indicate the number of days between re-invitation messages. The stop time may indicate the number of days before the event to stop re-inviting people. In the example illustrated in FIG. 11, the re-invitation message may be sent seven days before the event and the number of days between re-invitations may be two. In addition, the number of days before the event to stop sending the re-invitations is one. Any other numbers may be provided. In alternative implementations, the values entered in the reinvitation section 1120 may be in hours, minutes or any other unit of time.

The user may then enter meeting reminder delivery information [step 550]. The server 130 may automatically send out reminder messages to those invitees that have accepted an invitation to attend the meeting/event. To enable this feature, the user may enter the desired start time, frequency, and stop time in the respective boxes in reminder section 1125 (FIG. 11). The start time may indicate the number of days before the event to begin sending out reminder messages. The frequency may indicate the number of days between reminder messages. The stop time may indicate the number of days before the event to stop sending reminder messages. For example, referring to FIG. 11, the reminder message may be sent seven days before the event and the number of days between reminders may be two. In addition, the number of days before the event to stop sending reminders may be one. In alternative implementations, the values entered in the reminder section 1125 may be in hours, minutes or any other unit of time.

The user may then save all meeting specific information for immediate or later execution [step 560]. All meeting specific information entered via GUI 1100 of FIG. 11 may be saved, for example, by initiating the graphical update button 1130. The user may use input device 350 (FIG. 3) to select update button 1130.

Figure 6:
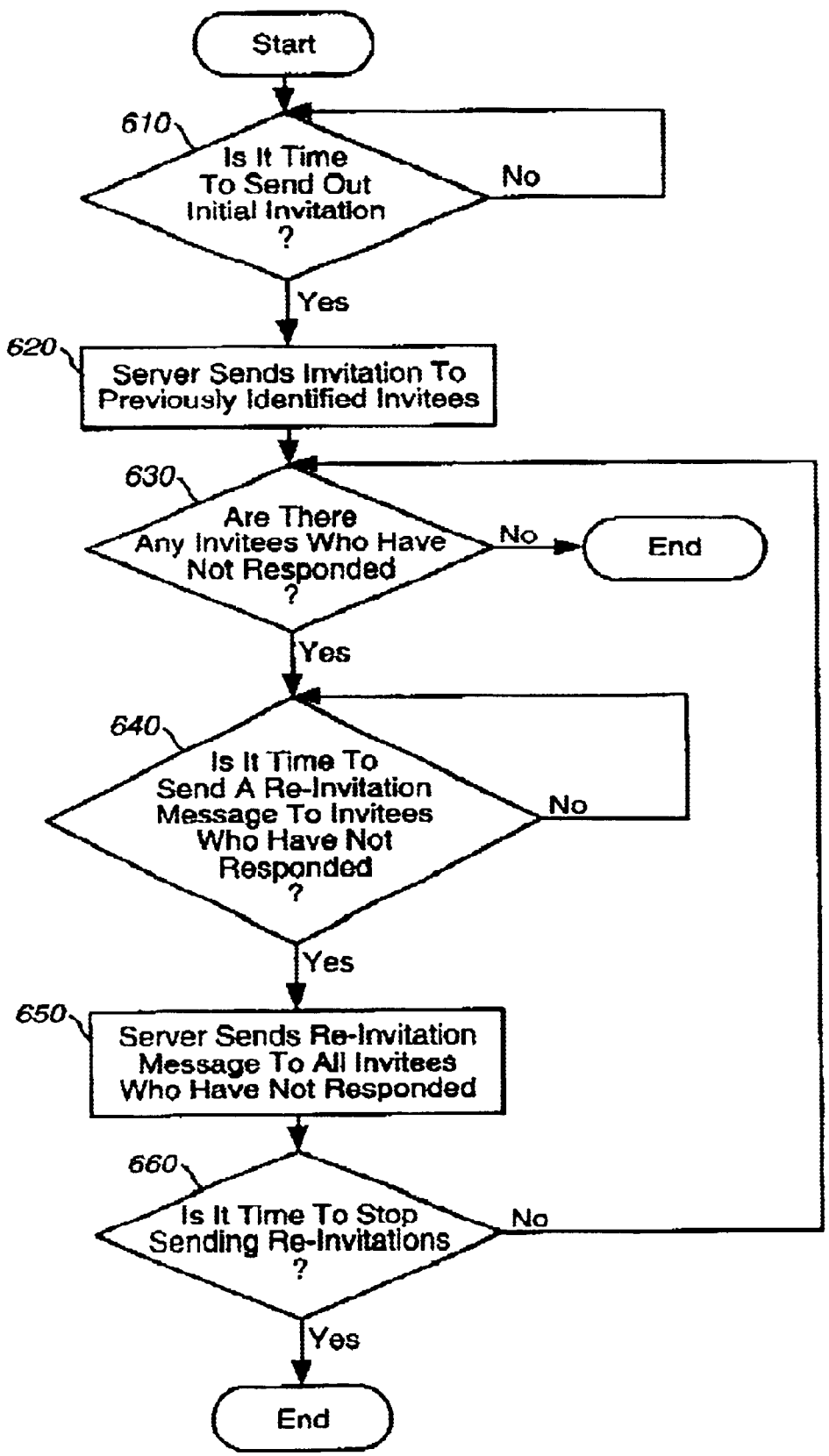

FIG. 6 illustrates an exemplary process, consistent with the present invention, associated with the event scheduling tool for automatically sending out initial invitations and re-invitations to invitees. The process begins by server 130 determining if it is time to send out the initial invitations [step 610]. The determination may be made based on the information input through initial delivery section 1115 (FIG. 11), such as deliver immediately, deliver "x" days before the event (where "x" is chosen by the user), or do not schedule. If it is not time to send out the initial invitations, then the server 130 will continue to wait until the appropriate time. If it is time to send out the initial invitations, then the server 130 transmits initial invitations to all invitees [step 620]. The invitee list may be determined based on information previously entered by the user at step 510. This initial invitation message may be received by each invitee in the form of an e-mail sent to each invitee's electronic mailbox.

The server 130 then determines whether there are any invitees that have not responded to the invitation [step 630]. If there are no invitees who have not responded (i.e., all invitees have already responded), then the invitation process ends. If there are invitees who have not yet responded to the initial invitation, the server 130 determines whether it is time to send a reinvitation to those invitees [step 640]. If it is not time to send out re-invitations, then the server 130 waits until the appropriate time. The appropriate time determination may be based on the information input by the user in the "Start" and "Frequency" boxes of the re-invitation section 1120 (FIG. 11).

If the server 130 determines that it is time to send re-invitation messages to invitees who have not yet responded, then the server 130 sends a re-invitation message to all non-responding invitees [step 650]. The re-invitation messages may be sent via e-mail to all invitees that have failed to respond to the previous invitation message. This list of individuals is based on the status of each individual as maintained by the event scheduling tool, as described in more detail below. The server 130 may then determine whether it is time to stop sending re-invitations [step 660]. This determination may be made based on previous user input in the "Stop" box in reinvitation section 1 120. Steps 630, 640, 650, and 660 may then be repeated until such a time that either all invitees have responded, or until the stop date is reached after which no more reinvitation messages are to be sent.

Figure 7:
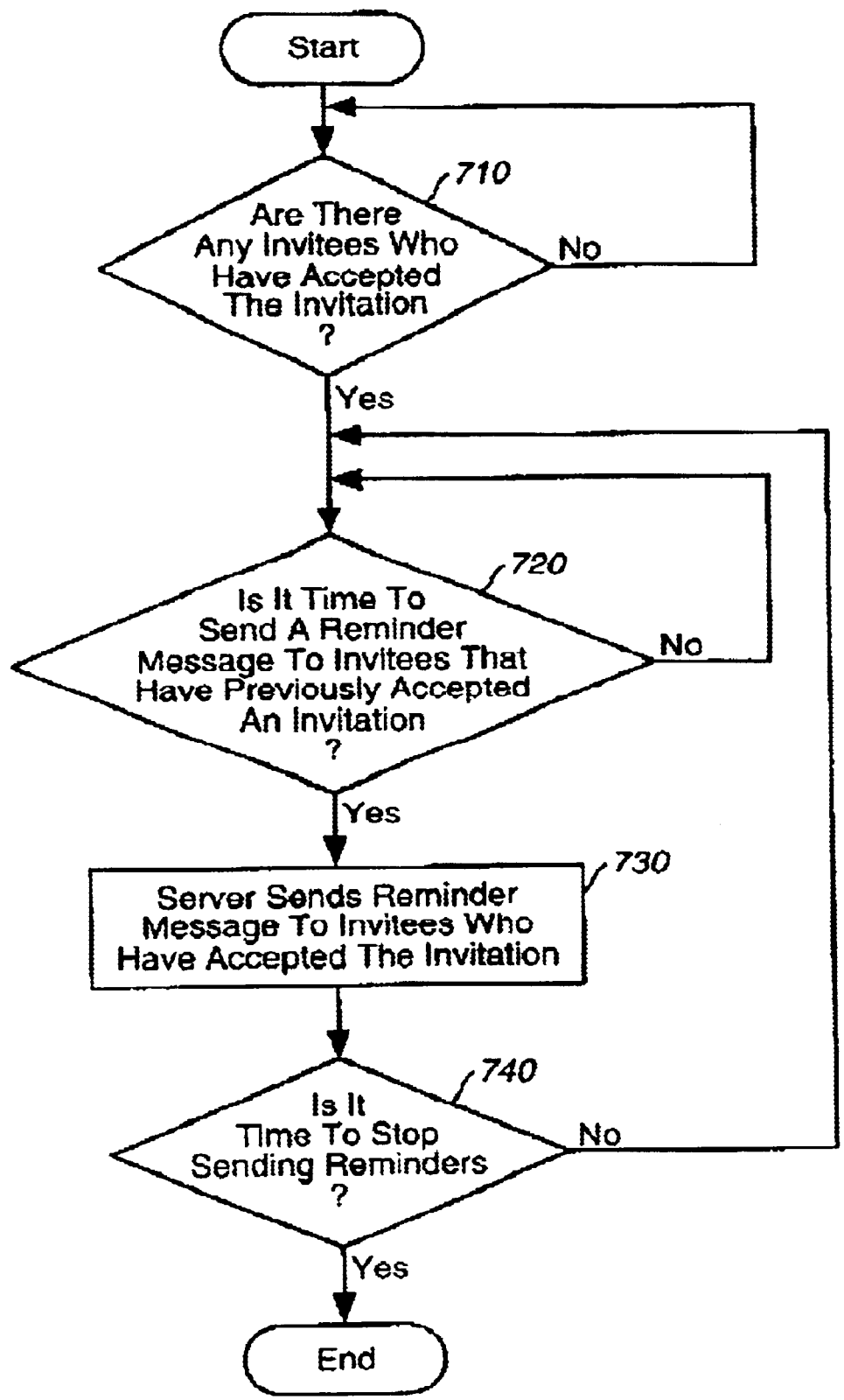

FIG. 7 illustrates an exemplary process, consistent with the present invention, for transmitting reminder messages to invitees who have previously accepted an invitation to attend the event or meeting. The process begins by determining whether there are any invitees who have accepted an invitation to attend the event [step 710]. If the server 130 determines that there are no invitees who have responded that they will attend the event, then the reminder process will not proceed, but will wait until there are invitees who have accepted an invitation to attend the scheduled event. The determination may be based on responses received from the invitees to date, and recorded by server 130.

If there are invitees who have accepted the invitation to attend the event, then the server 130 determines whether it is time to send a reminder message to those invitees [step 720]. If the server 130 determines that it is not time to send out any reminder messages, then the server 130 will wait until it is time to do so. The determination may be based on previous input by the user to the reminder section 1125 (FIG. 11).

If the server 130 determines that it is time to send out reminder messages, then server 130 may send reminder messages to invitees that have accepted an invitation to the upcoming scheduled event [step 730]. These reminder messages may, for example, be sent out in the form of electronic data transmissions to the invitees' respective e-mail addresses. A determination may then be made as to whether it is time to stop sending out reminder messages [step 740]. This determination may be made based on previous input to the reminder section 1125 (FIG. 11). More specifically, it may be based on the user input to the "Stop" box in reminder section 1125. The "Stop" box may indicate the number of days before the event to stop sending reminder messages. In the example illustrated in FIG. 11, the server 130 may stop sending reminder messages one day before the scheduled event.

If the server 130 determines that it is not time to stop sending out reminder messages, then steps 720, 730, and 740 may be repeated. If the server 130 determines that it is time to stop sending out reminder messages, then the process stops.

EXEMPLARY PROCESS FOR RECEIVING RESPONSES AND GENERATING A STATUS REPORT

Figure 8:
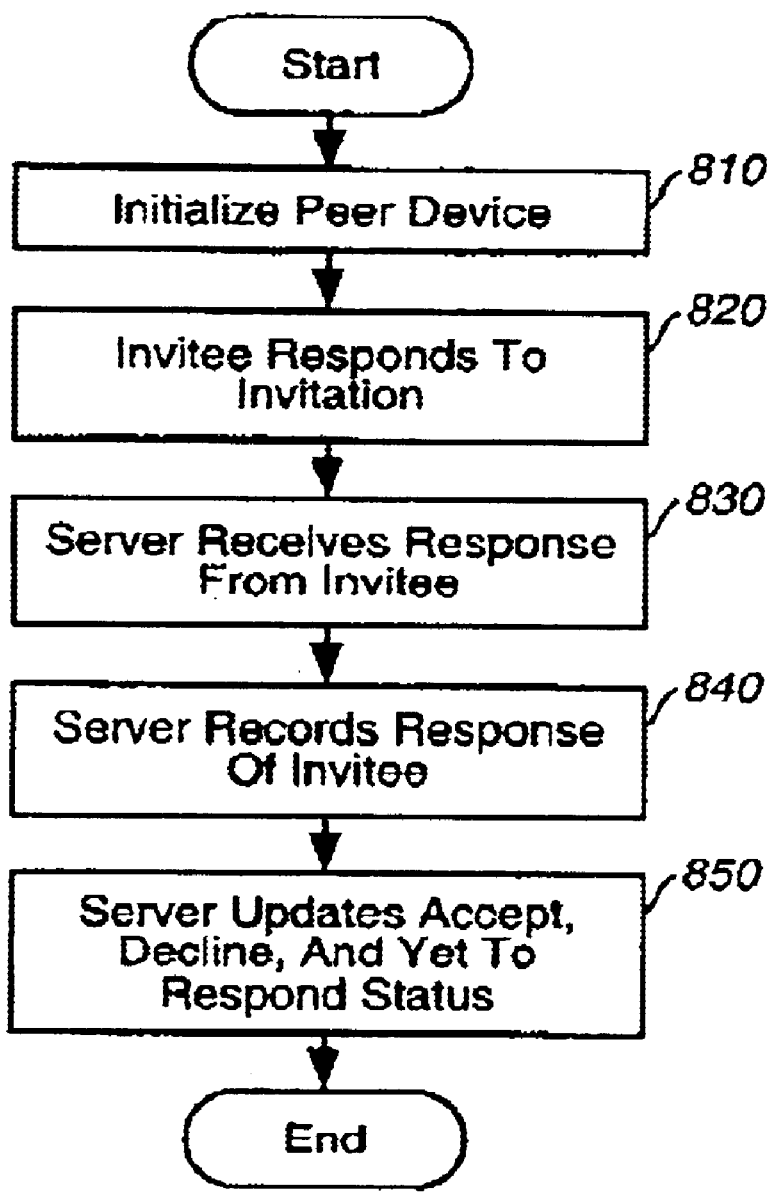
FIG. 8 illustrates exemplary processing for receiving responses from invitees and generating a status report, consistent with the present invention.

FIG. 8 illustrates an exemplary process, consistent with the present invention, for receiving responses from invitees and generating a status report based on the responses and lack of responses. Processing begins with the invitee initializing peer device 120 or peer device 160, depending upon where the invitee is located [step 810].

The invitee receives the invitation and may then respond to the invitation [step 820]. The invitee may respond in any number of ways. For example, for an invitee located at peer device 120 (i.e., within the firewall 140), the invitee may enter the response and transmit the response by selecting a hyperlink contained within the invitation message. The invitee may select the hyperlink by clicking on the hyperlink. If the invitee is located at peer device 160 (i.e., outside the firewall 140), then the invitee may respond to the event invitation by sending an email reply message to the server 130. The invitee may respond in any number of other conventional ways to the invitation message. In any event, the response contains the invitee's positive or negative response to the invitation. That is, the response indicates whether the invitee plans to attend the event.

The server 130 receives the responses from the individual invitees through any appropriate electronic method [step 830]. The server 130 identifies whether the response is a positive response (i.e., the invitee plans to attend the event) or a negative response (i.e., the invitee does not plan to attend the event). The server 130 may then associate each response with the corresponding invitee and records the responses [step 840]. These responses may be stored, for example, in storage device 250 (FIG. 2).

In an exemplary implementation of the present invention, the server 130 may create a number of categories for the responses. For example, the server 130 may create "accept," "decline," and "yet to respond" categories. In other implementations of the present invention, other categories, such as "probably will attend" or "may attend," may be added based on the particular user requirements. In any event, when a response is received, the server 130 records the response associated with the particular invitee and updates the appropriate category based on the response [step 850]. The server 130 may perform this update each time a response is receive, thereby enabling the server 130 to have an up-to-date status regarding the status of the invitees.

EXEMPLARY PROCESS FOR PROVIDING STATUS REPORTS

Figure 9:
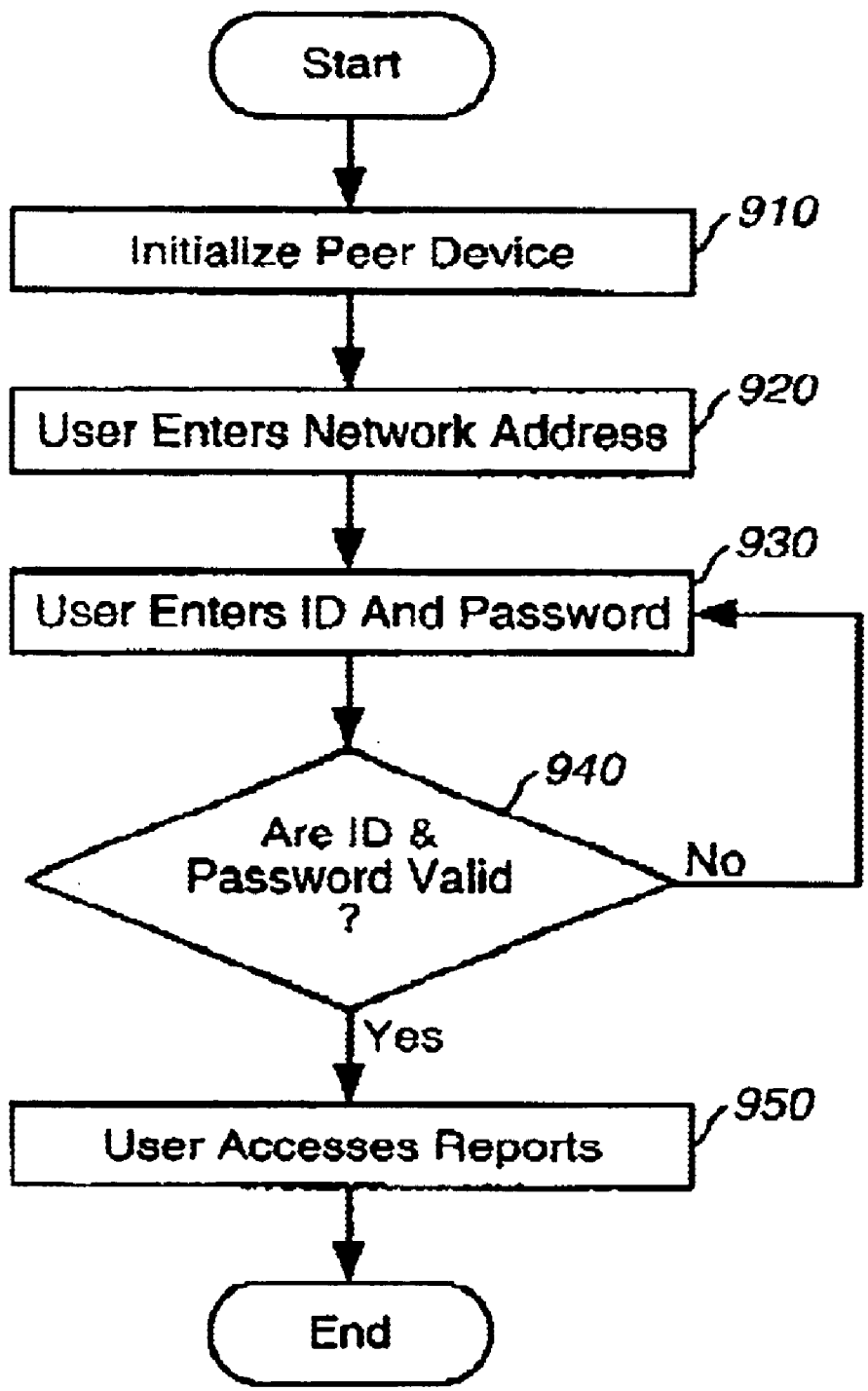
FIG. 9 illustrates exemplary processing for accessing a status report detailing the responses of all invitees, consistent with the present invention.

FIG. 9 illustrates an exemplary process, consistent with the present invention, in which the user may obtain a status update relating to the event. Processing begins with the user initializing a peer device, such as peer device 120 [step 910]. Initialization may include powering up the peer device 120 and performing a boot-up process. The user may then access server 130 [step 920]. For example, the user may enter a network address associated with server 130. Upon accessing server 130, the user may be prompted to enter unique personal identifiers before access to the event scheduling tool is authorized. The user may then enter a personal login identifier (ID) and associated password [step 930]. The server 130 then determines whether the login ID and password are valid [step 940]. If the login ID and associated password are not valid the user may be asked to reenter them. If the login ID and password are valid, the user will be permitted access to the event scheduling tool.

Following a successful login, the user may then access a report(s) showing the up-to-date status of the responses from all the parties invited to the scheduled event [step 950]. For example, after a successful login, the server 130 may download a home page associated with the event scheduling tool that includes a "Reports" button. The user may select the "Reports" button in a conventional manner. Alternatively, the user may access a reports graphical user interface by clicking on the Reports function 1018 on GUI 1000 (FIG. 10) or by entering an appropriate URL such as "www.eventschedulingtool.com/Reports.

Figure 12:
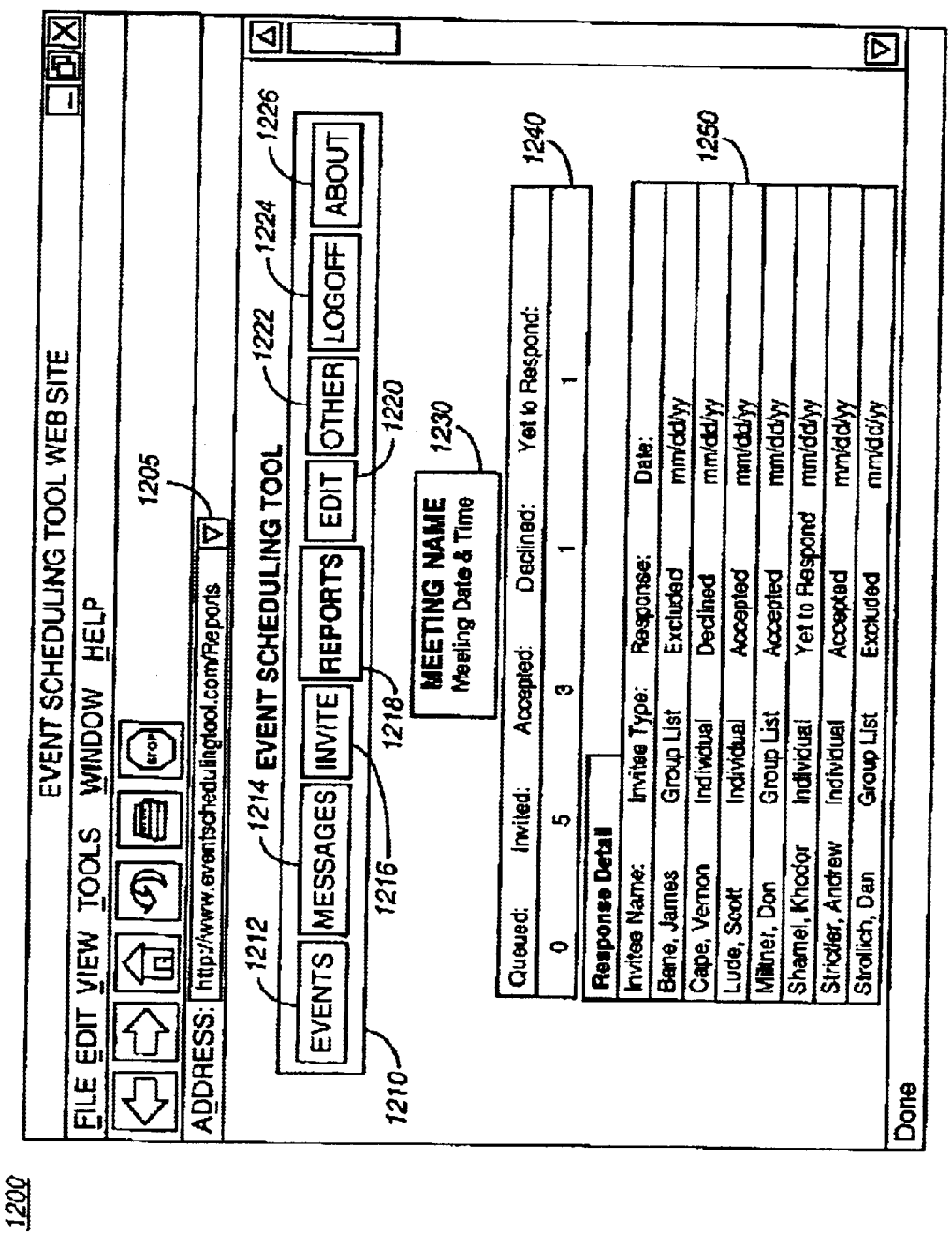
FIG. 12 illustrates an exemplary graphical user interface through which the user obtains information concerning the response status of all invitees.

FIG. 12 illustrates an exemplary GUI 1200, consistent with the present invention, for displaying status information associated with the event. The exemplary GUI 1200, in the form of a web page, includes a URL entry slot 1205, a function button set 1210, a meeting information indicator 1230, a response banner 1240, and a report table 1250.

The URL entry slot 1205 allows for the entry of a URL for navigation throughout the event scheduling tool within network 110. The function button set 1210 facilitates the initiation of various functions available to the user within the event scheduling tool. The functions available include events 1212, messages. 1214, invite 1216, reports 1218, edit 1220, other 1222, logoff 1224, and about 1226. These functions may perform the same functions described previously with regard to FIG. 10.

Meeting information indicator 1230 may indicate the meeting name, date, and time associated with a particular meeting currently being viewed. Response banner 1240 may contain a current display regarding a number of specific categories. For example, referring to FIG. 12, the categories may include "Queued," "Invited," "Accepted," "Declined," and "Yet to Respond." Other categories may be included based on the particular user requirements. The server 130 may update these categories each time that a reply is received from an invitee. A user may therefore view the response banner 1240 to get a quick summary of the status regarding the invitees. In the example illustrated in FIG. 12, the response banner 1240 indicates that five parties have been invited, three have accepted, one has declined, one has yet to respond and zero are queued (i.e., all the invitations have been sent).

Report table 1250 may include the reply information associated with each individual invitee. For example, the report table 1250 may include the invitee's name, the invitation type (e.g., group, individual, etc.), the response (e.g., accepted, declined, yet to respond) and the date of the response (if any). The report table 1250 lists the particular parties and their corresponding status. The server 130 updates the response banner 1240 and report table 1250 with each received reply from an invitee. Advantageously, the information in GUI 1200 enables a user to quickly review and analyze the status of the invitees for the scheduled event.

CONCLUSION

Systems and methods, consistent with the present invention, provide a mechanism by which the logistical management of inviting participants to attend a meeting or other event and maintaining an up-to-date account of the invitee replies may be automated by an event scheduling tool. After an initial interaction with a user, the event scheduling tool may communicate with the desired invitees up until the scheduled meeting time, and may allow the user to check the status of the attendance list at any time.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above-described processing is directed to managing the invitation and coordination process of setting up a meeting or other event, it will be appreciated that the present invention is equally applicable to a system for electronically tracking the responses to a questionnaire, survey, or poll. In such an implementation, the event planning tool may send out an initial message to questionnaire recipients asking them to complete the questionnaire within a specific time frame. Additional messages may be sent out to questionnaire recipients, who have not yet responded, reminding them to complete the questionnaire. The event planning tool may also keep track of those recipients who have completed the questionnaire and those who have not. A report may be maintained by the system, and available to the questionnaire advocate, that would contain a list of every questionnaire recipient and the status of their response or non-response.

While series of steps have been described with regard to FIGS. 4–9, the order of the steps may be varied in other implementations consistent with the present invention. No element, step, or instruction used in the description of the present application should be construed as critical or essential to the invention unless explicitly described as such.

The scope of the invention is defined by the claims and their equivalents.

What is claimed is:

1. A computer-implemented method for managing an event, comprising:
   receiving event information, the event information including information indicating when to transmit an invitation message and when to transmit a re-invitation message;
   generating an invitation message relating to the event;
   transmitting the invitation message to a plurality of event invitees;
   receiving at least one response from at least one of the invitees;
   determining whether the response indicates a positive or negative response to the invitation;
   recording the positive or negative response associated with the invitee;
   identifying a first group of invitees without a recorded response;
   transmitting the re-invitation message to the first group of invitees and not to a second group of invitees with recorded responses; and
   generating a status report based on the responses.

2. The computer-implemented method of claim 1, wherein the receiving event information comprises:
   receiving information identifying the plurality of event invitees, and
   receiving at least one of time information and location information relating to the event.

3. The computer-implemented method of claim 1, wherein the receiving event information includes:
   receiving information-indicating when to transmit a reminder message relating to the event, the reminder message being transmitted to invitees associated with positive responses.

4. The computer-implemented method of claim 1, wherein receiving event information includes:
   receiving information indicating when to stop transmitting the re-invitation message.

5. The computer-implemented method of claim 1, further comprising:
   generating a reminder message based on the received event information; and
   transmitting the reminder message to invitees associated with positive responses.

6. The computer-implemented method of claim 1, wherein the transmitting the invitation message includes:
   sending the invitation message via a network.

7. The computer-implemented method of claim 1, further comprising:
   transmitting a reminder message to an invitee associated with a positive response.

8. The computer-implemented method of claim 1, wherein the generating a status report includes:
   associating an invitee with a corresponding response,
   updating at least one of an accepted category and a declined category based on the response, and
   displaying a list of the invitees and their corresponding responses.

9. A system for managing an event, comprising:
   a memory configured to store a plurality of user interface screens; and
   a processor coupled to the memory and configured to:
      receive information entered via at least one of the user interface screens, the information relating to the event, generate an invitation message relating to the event, transmit the invitation message to a plurality of event invitees, receive responses from the invitees, identify a first group of invitees that have not responded, transmit a re-invitation message to the first group of invitees at a predetermined time and not to a second group of invitees that have responded, and generate a status report based on the responses.

10. The system of claim 9, wherein the received information includes a list of invitees and at least one of time information and location information relating to the event.

11. The system of claim 9, wherein the processor is further configured to:

generate a reminder message, and transmit the reminder message to each invitee associated with a positive response.

12. The system of claim 11, wherein the processor is further configured to:

transmit the invitation message to the plurality of invitees at a predetermined time based on the received information.

13. The system of claim 9, wherein the processor is further configured to:

update the first group of invitees when responses are received; and determine when to stop transmitting re-invitation messages.

14. The system of claim 9, wherein the plurality of user interface screens include at least one of a messages screen for receiving message information relating to the event and a scheduling screen for receiving information relating to when to transmit at least one of the invitation, the re-invitation and a reminder message.

15. The system of claim 9, wherein when generating a status report, the processor is configured to:

associate an invitee with a corresponding response, and determine a number of invitees corresponding to an accepted category, a declined category and a not responding category.

16. The system of claim 9, wherein the processor is further configured to:

transmit a reminder message to invitees that have accepted the invitation, the reminder message being transmitted a predetermined time before the event; and transmit the re-invitation to invitees that have not responded to the invitation, the re-invitation being transmitted a predetermined time before the event.

17. A computer-readable medium having stored thereon a plurality of sequences of instructions, said instructions including sequences of instructions which, when executed by at least one processor, cause said processor to:

provide a user interface for entering event information;

receive event information via the user interface;

generate an invitation message relating to the event;

transmit the invitation message to a plurality of event invitees;

receive at least one response from at least one of the invitees;

determine whether the received at least one response indicates a positive or negative response to the invitation;

record the positive or negative responses associated with the plurality of invitees;

identify invitees without a recorded response;

transmit a re-invitation message to the identified invitees without a recorded response and not to invitees with a recorded response; and generate a status report based on the responses.

18. The computer-readable medium of claim 17, wherein the event information includes a list of invitees and time and location information relating to the event, and the invitation and re-invitation messages each include time and location information, wherein the instructions further said processor to:

generate a reminder message relating to the event.

19. The computer-readable medium of claim 18, including instructions for further causing said processor to:

transmit the invitation message to the plurality of event invitees at a predetermined time based on the received event information.

20. The computer-readable medium of claim 18, including instructions for further causing said processor to:

transmit the re-invitation message at a predetermined time.

21. The computer-readable medium of claim 20, further including instructions for causing said processor to:

determine when to stop transmitting re-invitation messages.

22. The computer-readable medium of claim 24, including instructions for further causing said processor to:

transmit the reminder message to invitees associated with positive responses.

23. The computer-readable medium of claim 17, wherein the user interface includes at least one of a messages screen for receiving message information relating to the event and a scheduling screen for receiving information relating to when to transmit at least one of the invitation, the re-invitation and a reminder message.

24. The computer-readable medium of claim 17, wherein when generating a status report, the instructions cause said processor to:

associate an invitee with a corresponding response, and determine a number of invitees corresponding to an accepted category, a declined category and a not responding category.

25. The computer-readable medium of claim 24, wherein the instructions further cause said processor to:

transmit a reminder message to invitees that have accepted the invitation, the reminder message being transmitted a predetermined time before the event; and transmit the re-invitation a predetermined time before the event.

26. A method for tracking responses to a questionnaire, comprising:

transmitting the questionnaire to a plurality of recipients;

receiving responses to the questionnaire from at least one of the recipients;

transmitting reminder notices to non-responding recipients and not to the at least one responding recipient; and generating a status report based on the responses.

27. A computer-readable medium having stored thereon a plurality of sequences of instructions, said instructions including sequences of instructions which, when executed by at least one processor, cause said processor to:

receive event scheduling information;

send a first electronic notification regarding the event to a plurality of recipients;

receive a response from at least one of the plurality of recipients:

identify non-responding recipients; and send at least a second notification to the identified non-responding recipients prior to the event and not to the at least one of the plurality of recipients that have responded.

28. A computer-readable medium having stored thereon a plurality of sequences of instructions, said instructions including sequences of instructions which, when executed by at least one processor, cause said processor to:

transmit a message to a plurality of parties;

receive responses to the message from at least one of the parties;

record the responses to generate a status report;

output the status report to a display device, wherein the display device displays the status of each of the plurality of parties in a single user interface screen;

update the status report as additional responses are received; and transmit a reminder message to a first group of the plurality of parties without recorded responses and not to a second group of the plurality of parties with recorded responses.

29. A computer readable medium containing instructions for controlling at least one processor to perform a method for notifying desired attendees for a scheduled event, the method comprising:

receiving information relating to when to transmit a notification message, a renotification message and a reminder message to the desired attendees;

transmitting the notification message to the desired attendees;

receiving responses from at least a portion of the desired attendees;

identifying a first group of the desired attendees that have not responded to the notification message;

transmitting the renotification message to the first group and not to a second group of the desired attendees that have responded to the notification message:

transmitting the reminder message to a portion of the second group who have responded that they will attend the scheduled event; and preparing a status report relating to the responses of the desired attendees.

\* \* \* \* \*